(12) United States Patent
Rittmeyer et al.

(10) Patent No.: US 9,410,611 B2
(45) Date of Patent: Aug. 9, 2016

(54) CARRIER SHAFT SET

(71) Applicant: Hamilton Sundstrand Corporation, Charlotte, NC (US)

(72) Inventors: Gregory Alan Rittmeyer, Winnebago, IL (US); Kevin J. Koester, Winnebago, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 64 days.

(21) Appl. No.: 14/562,791

(22) Filed: Dec. 8, 2014

(65) Prior Publication Data

US 2015/0192200 A1 Jul. 9, 2015

Related U.S. Application Data

(60) Provisional application No. 61/923,825, filed on Jan. 6, 2014.

(51) Int. Cl.
*F16H 57/08* (2006.01)
*H02K 7/00* (2006.01)

(52) U.S. Cl.
CPC .............. *F16H 57/082* (2013.01); *H02K 7/003* (2013.01); *Y10T 29/49465* (2015.01)

(58) Field of Classification Search
CPC .................................................... F16H 57/082
See application file for complete search history.

(56) References Cited

U.S. PATENT DOCUMENTS

| 4,252,035 | A | 2/1981 | Cordner et al. |
| 4,713,982 | A | 12/1987 | Fluegel et al. |
| 4,734,590 | A | 3/1988 | Fluegel |
| 2005/0130792 | A1 | 6/2005 | Drago et al. |
| 2006/0223664 | A1* | 10/2006 | Duong ................. F16H 57/042 475/159 |
| 2010/0304918 | A1 | 12/2010 | Burgman et al. |
| 2011/0277573 | A1 | 11/2011 | Duong |
| 2013/0337967 | A1* | 12/2013 | Kleine-Brockhoff ..... F16H 1/28 475/331 |
| 2014/0274550 | A1* | 9/2014 | Senoo ................... F16H 57/082 475/331 |
| 2015/0065291 | A1* | 3/2015 | Kiesenbauer ........... F16H 7/082 475/331 |

FOREIGN PATENT DOCUMENTS

DE 102010051863 5/2012

OTHER PUBLICATIONS

European Patent Application No. 142006402 Extended European Search Report dated May 11, 2015, 6 pages.

* cited by examiner

Primary Examiner — Tisha Lewis
(74) Attorney, Agent, or Firm — Cantor Colburn LLP (57) ABSTRACT

A carrier shaft set includes an input carrier shaft portion and a carrier shaft portion. The input carrier shaft portion has an input carrier shaft portion axis defined between a planetary gear set end and an input shaft end having an outer surface. The input carrier shaft portion includes a wedge-shaped member having an outer edge. A ratio of a length defined between the input carrier shaft portion axis and the outer edge to the outer surface is between 1.23 and 1.30. The carrier shaft portion has a carrier shaft portion axis defined between a planetary gear set end and a shaft end. The carrier shaft portion includes a shaft portion having an outer surface and a wedge-shaped member having an outer edge. A ratio of a length defined between the carrier shaft portion axis and the outer edge to the shaft portion outer surface is between 1.23 and 1.30.

15 Claims, 7 Drawing Sheets

CARRIER SHAFT SET

CROSS-REFERENCE TO RELATED APPLICATIONS

This patent application claims priority to U.S. Provisional Application No. 61/923,825, filed Jan. 6, 2014, which is incorporated herein by reference in its entirety.

BACKGROUND OF THE INVENTION

The subject matter disclosed herein relates to integrated drive generators (IDGs), and more specifically, to an IDG carrier shaft set.

In a conventional IDG system, a drive shaft connectable to an output shaft driven by an aircraft engine is connected to a mechanical differential, with the differential having an output connected to drive the generator. A variable speed transmission, such as a hydrostatic transmission or log, is associated with the mechanical differential and controlled to modify the output of the differential, as required, whereby the input speed to the generator remains constant even though the speed of the drive shaft may vary. There are a variety of structural arrangements for a constant speed drive and generator system.

A carrier shaft assembly can support a number of loads associated with driving the IDG through a planetary gear system disposed within and about a carrier shaft set that includes a carrier shaft and an input carrier shaft. A carrier shaft set is typically designed with symmetrical machining about a principle axis. When the carrier shaft assembly is oriented in operation to rotate about an operational axis that is different than the principle axis, a rotational load imbalance imparts additional forces. Imbalanced bearing loads can lead to premature wear and/or failure. Accordingly, there is a need for a carrier shaft set and assembly that reduce rotational load imbalance in an IDG system.

BRIEF DESCRIPTION OF THE INVENTION

According to one aspect, a carrier shaft set is provided that includes an input carrier shaft portion and a carrier shaft portion. The input carrier shaft portion has an input carrier shaft portion axis defined between a planetary gear set end and an input shaft end, where the input shaft end has an outer surfacesurface. The input carrier shaft portion includes a wedge-shaped member having an edge and an outer edge that defines a taper region relative to the edge of the wedge-shaped member. A ratio of a length defined between the input carrier shaft portion axis and the outer edge to the outer surface of the input shaft end is between 1.23 and 1.30. The carrier shaft portion has a carrier shaft portion axis defined between a planetary gear set end and a shaft end. The carrier shaft portion includes a shaft portion having an outer surface and a wedge-shaped member having an edge and an outer edge that defines a taper region relative to the edge of the wedge-shaped member. A ratio of a length defined between the carrier shaft portion axis and the outer edge to the outer surface of the shaft portion is between 1.23 and 1.30.

According to another aspect, a method for assembling a carrier shaft assembly includes providing an input carrier shaft portion having an input carrier shaft portion axis defined between a planetary gear set end and an input shaft end, where the input shaft end has an outer surface. The input carrier shaft portion includes a wedge-shaped member having an edge and an outer edge that defines a taper region relative to the edge of the wedge-shaped member. A ratio of a length defined between the input carrier shaft portion axis and the outer edge to the outer surface of the input shaft end is between 1.23 and 1.30. The method also includes providing a carrier shaft portion having a carrier shaft portion axis defined between a planetary gear set end and a shaft end. The carrier shaft portion includes a shaft portion having an outer surface and a wedge-shaped member having an edge and an outer edge that defines a taper region relative to the edge of the wedge-shaped member. A ratio of a length defined between the carrier shaft portion axis and the outer edge to the outer surface of the shaft portion is between 1.23 and 1.30. The method further includes aligning the input carrier shaft portion axis of the input carrier shaft portion with the carrier shaft portion axis of the carrier shaft portion to form a principle axis of the carrier shaft assembly.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
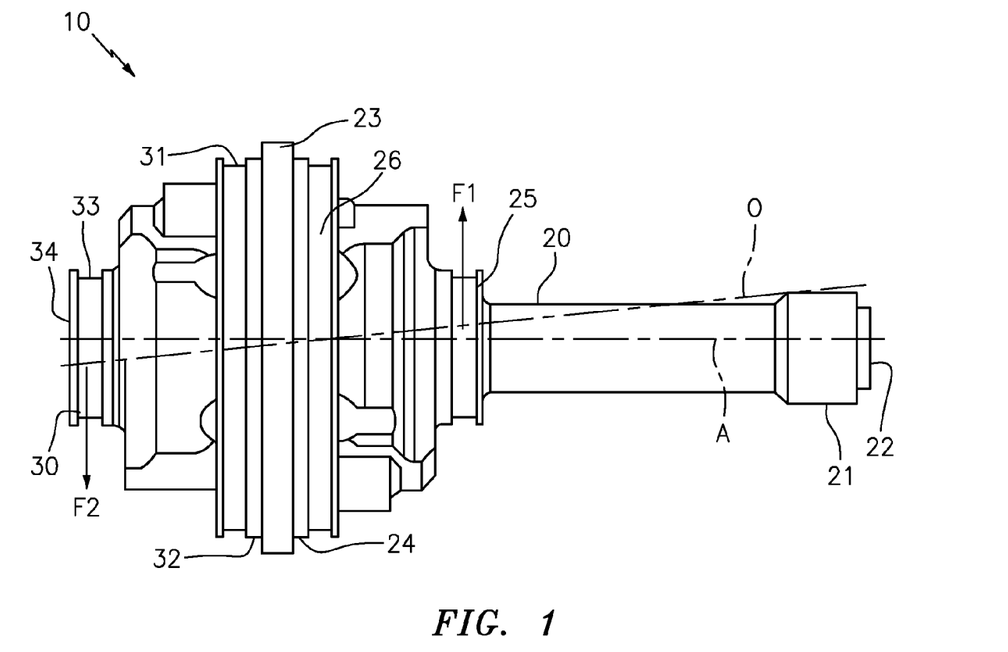
FIG. 1 is a side view of a carrier shaft assembly for an integrated drive generator in accordance with an embodiment.
Figure 2:
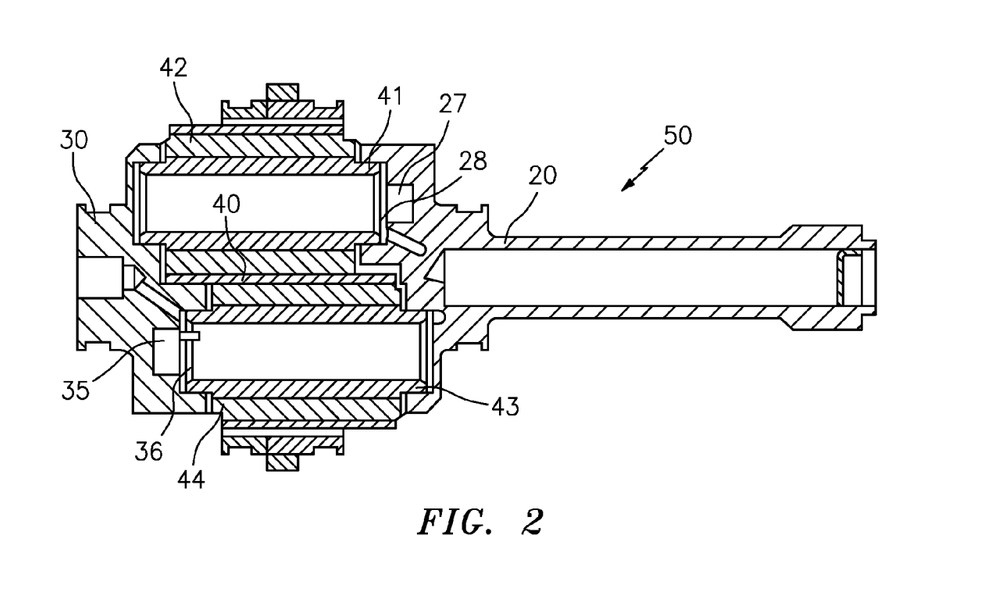
FIG. 2 is a cross-sectional view of the carrier shaft assembly of FIG. 1.

Referring to FIGS. 1 and 2, a carrier shaft assembly 10 for an integrated drive generator (IDG) is illustrated. The carrier shaft assembly 10 includes a carrier shaft portion 20, an input carrier shaft portion 30, and a planetary gear set 40 as best viewed in FIG. 2. The carrier shaft portion 20 and the input carrier shaft portion 30 are together referred to as a carrier shaft set 50. The carrier shaft portion 20 includes a first geared portion 21 proximate a shaft end 22 and a second geared portion 23 proximate a planetary gear set end 24. The carrier shaft portion 20 also includes a first bearing race 25 and a second bearing race 26. The first bearing race 25 and the second bearing race 26 are disposed to receive bearings to support a differential including an output ring gear (not depicted) for an IDG. The input carrier shaft portion 30 also includes a first bearing race 31 proximate a planetary gear set end 32 and a second bearing race 33 proximate an input shaft end 34. The first bearing race 31 and the second bearing race 33 are disposed to receive bearings to support an input ring gear (not depicted) for an IDG.

The planetary gear set 40 includes a first planet shaft 41 with a first planet gear 42 and a second planet shaft 43 with a second planet gear 44. The planetary gear set 40 may be part of a planetary gear system for an IDG that includes an input ring gear and an output ring gear (not depicted). The first planet shaft 41 is proximate a bore 27 in a planetary gear set side 28 of the carrier shaft portion 20. The second planet shaft 43 is proximate a bore 35 in a planetary gear set side 36 of the input carrier shaft portion 30.

The carrier shaft assembly 10 has a principle axis A defined as a centerline through the carrier shaft assembly 10. An operational axis O of the carrier shaft assembly 10 is offset from the principle axis A when operably installed in an IDG. Misalignment of the operational axis O relative to the principle axis A may result in inducing a force F1 from the first bearing race 25 of the carrier shaft portion 20 and a force F2 from the second bearing race 33 of the input carrier shaft portion 30. Forces F1 and F2 can result in imbalance bearing loads in multiple bearings (not depicted). An exemplary embodiment reduces the forces F1 and F2 while supporting gear loads and maintaining products of inertia as close to zero as reasonably possible for the carrier shaft assembly 10.

Figure 3:
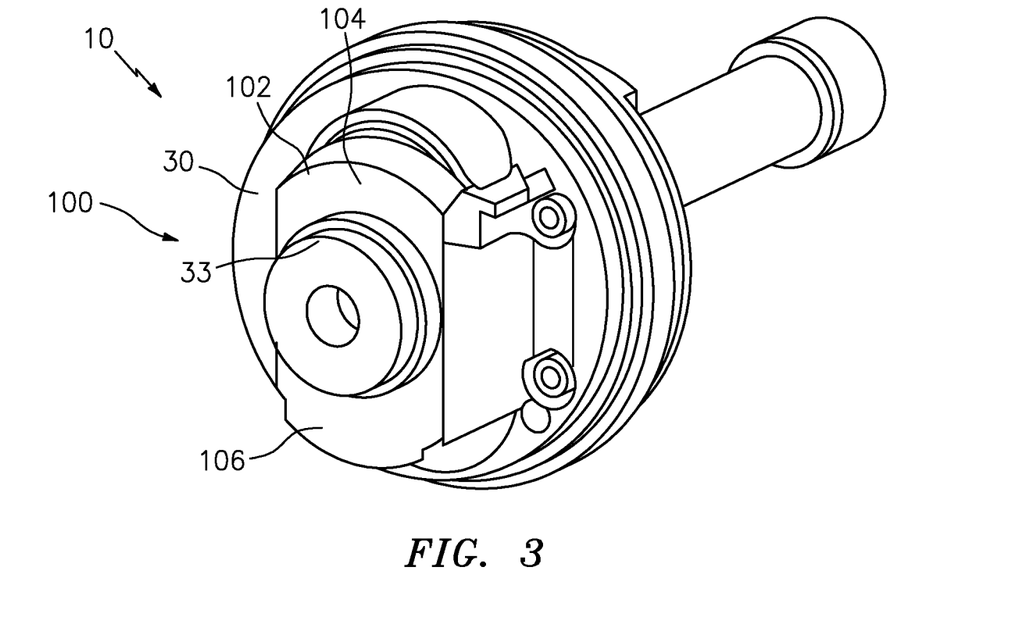
FIG. 3 is a perspective view of the carrier shaft assembly of FIG. 1 at an input side.

FIG. 3 is a perspective view of the carrier shaft assembly 10 of FIG. 1 at an input side 100 of the input carrier shaft portion 30. The input side 100 of the input carrier shaft portion 30 includes a wedge-shaped member 102 having a wider wedge portion 104 and a narrower wedge portion 106 proximate the second bearing race 33 of the input carrier shaft portion 30.

Figure 4:
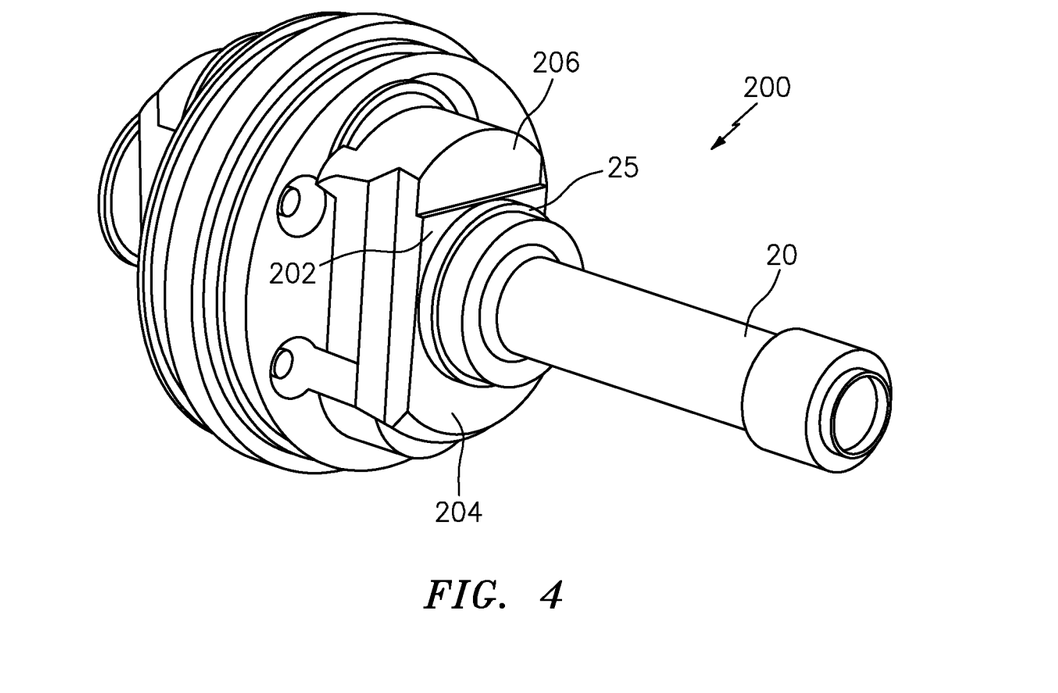
FIG. 4 is a perspective view of the carrier shaft assembly of FIG. 1 at a carrier shaft side.

FIG. 4 is a perspective view of the carrier shaft assembly 10 of FIG. 1 at a carrier shaft side 200 of the carrier shaft portion 20. The carrier shaft side 200 of the carrier shaft portion 20 includes a wedge-shaped member 202 having a wider wedge portion 204 and a narrower wedge portion 206 proximate the first bearing race 25 of the carrier shaft portion 20. As depicted in FIGS. 3 and 4, the wider wedge portion 104 of the input carrier shaft portion 30 is substantially axially aligned with the narrower wedge portion 206 of the carrier shaft portion 20. Similarly, the narrower wedge portion 106 of the input carrier shaft portion 30 is substantially axially aligned with the wider wedge portion 204 of the carrier shaft portion 20.

Figure 5:
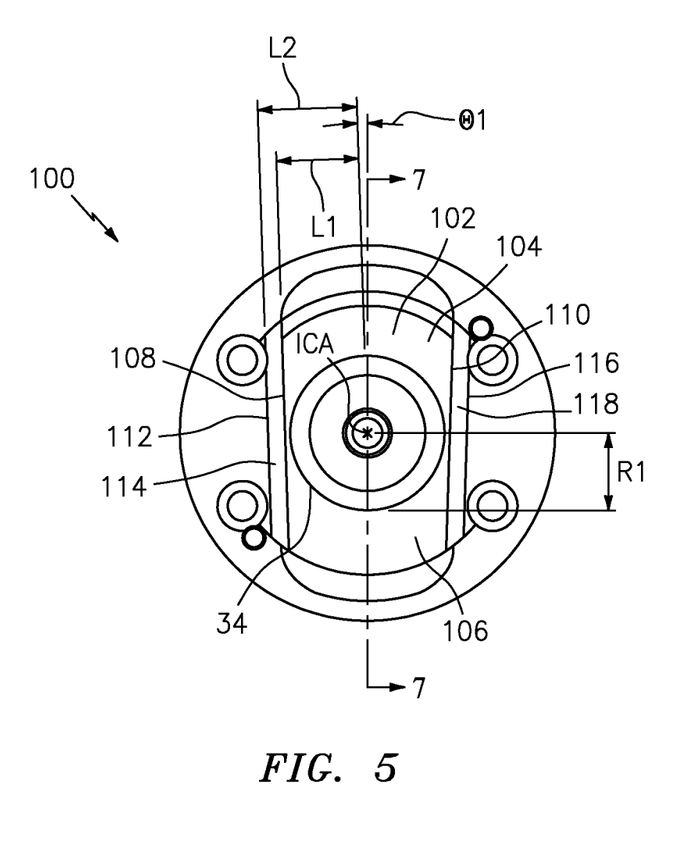
FIG. 5 is an end view of an input carrier shaft portion of the carrier shaft assembly of FIG. 1 at the input side.

FIG. 5 is an end view of the input carrier shaft portion 30 of the carrier shaft assembly 10 of FIG. 1 at the input side 100. An input carrier shaft portion axis ICA of the input carrier shaft portion 30 is defined between the planetary gear set end 32 and the input shaft end 34 of FIG. 1 to align with the principle axis A of FIG. 1. In an embodiment, an outer surface R1 of the input shaft end 34 is about 0.75 inches (1.905 cm) relative to ICA. The wider wedge portion 104 and the narrower wedge portion 106 are defined by edges 108 and 110 of the wedge-shaped member 102 offset at an angle Θ1 of about 2.0 degrees from normal with respect to ICA. An outer edge 112 defines a taper region 114 relative to edge 108, and an outer edge 116 defines a taper region 118 relative to edge 110 such that the taper regions 114 and 118 are substantially symmetric about ICA with respect to each other. In an embodiment, a length L1 defined between ICA and edge 108 is about 0.781 inches (1.984 cm), and a length L2 defined between ICA and outer edge 112 is about 0.95 inches (2.413 cm). A ratio of length L1 to the outer surface R1 is between 1.01 and 1.07. A ratio of length L2 to the outer surface R1 is between 1.23 and 1.30.

Figure 6:
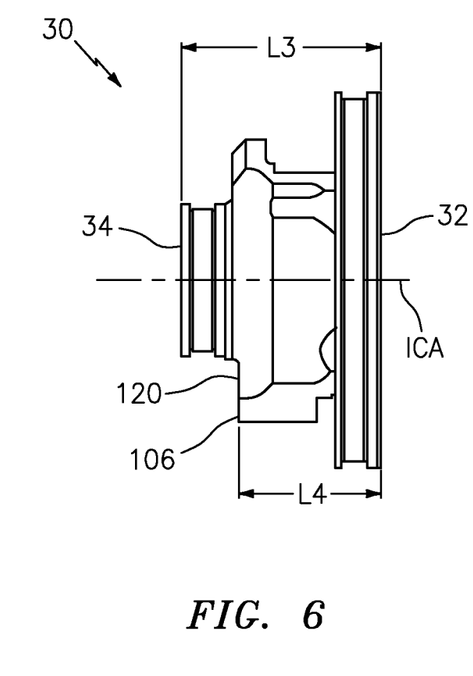
FIG. 6 is a side view of the input carrier shaft portion of the carrier shaft assembly of FIG. 1.

FIG. 6 is a side view of the input carrier shaft portion 30 of the carrier shaft assembly 10 of FIG. 1. In an embodiment, the input carrier shaft portion 30 has a length L3 of about 1.896 inches (4.816 cm) defined between the planetary gear set end 32 and the input shaft end 34. A length L4 of about 1.345 inches (3.416 cm) is defined between the planetary gear set end 32 and a surface 120 of the narrower wedge portion 106. A ratio of length L3 to length L4 is between 1.39 and 1.43.

Figure 7:
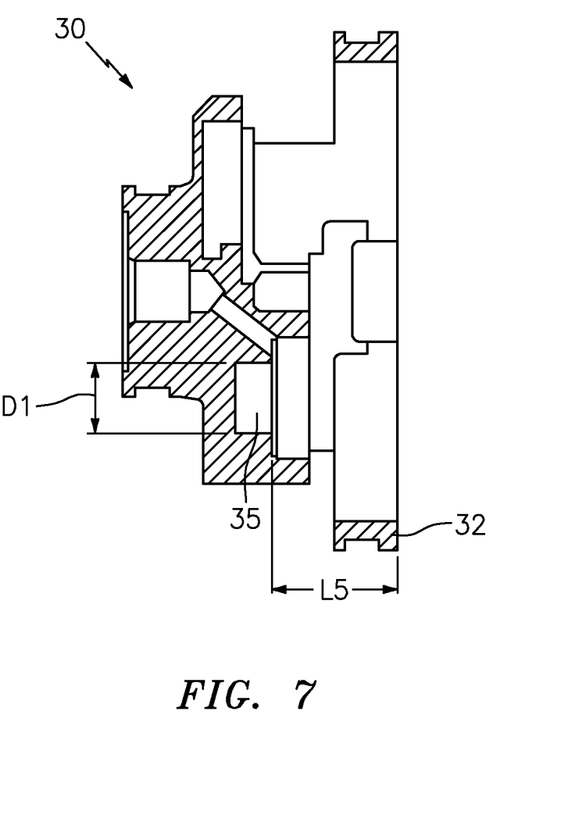
FIG. 7 is a cross-sectional view of the input carrier shaft portion of the carrier shaft assembly of FIG. 1.

FIG. 7 is a cross-sectional view of the input carrier shaft portion 30 of the carrier shaft assembly 10 of FIG. 1 taken at section line 7-7 of FIG. 5. FIG. 7 depicts bore 35 is greater detail. In an embodiment, the bore 35 extends a length L5 of about 1.124 inches (2.855 cm) from the planetary gear set end 32 and has a diameter D1 of about 0.5 inches (1.27 cm). A ratio of length L5 to diameter D1 is between 2.2 and 2.3.

Figure 8:
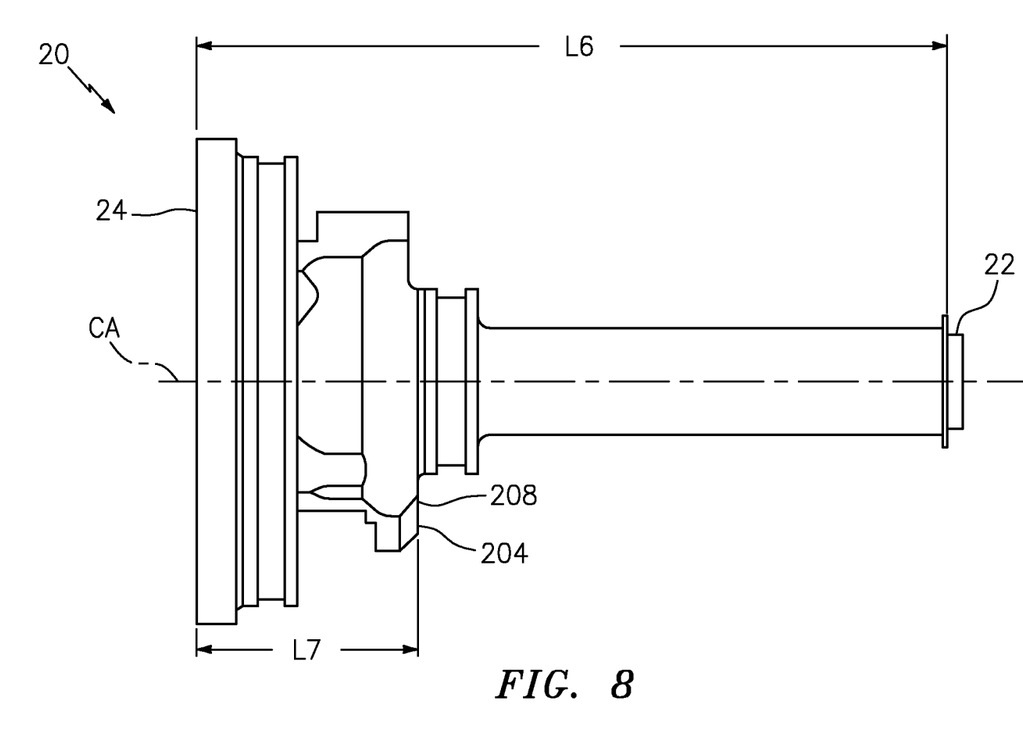
FIG. 8 is a side view of a carrier shaft portion of the carrier shaft assembly of FIG. 1.

FIG. 8 is a side view of the carrier shaft portion 20 of the carrier shaft assembly 10 of FIG. 1. A carrier shaft portion axis CA of the carrier shaft portion 20 is defined between the planetary gear set end 24 and the shaft end 22 to align with the principle axis A of FIG. 1. As can be seen in FIG. 8, the carrier shaft portion 20 has a length L6 of about 6.09 inches (15.469 cm) from the shaft end 22 to the planetary gear set end 24. A length L7 of about 1.758 inches (4.465 cm) is defined between a surface 208 of the wider wedge portion 204 and the planetary gear set end 24. A ratio of length L6 to length L7 is between 3.44 and 3.49.

Figure 9:
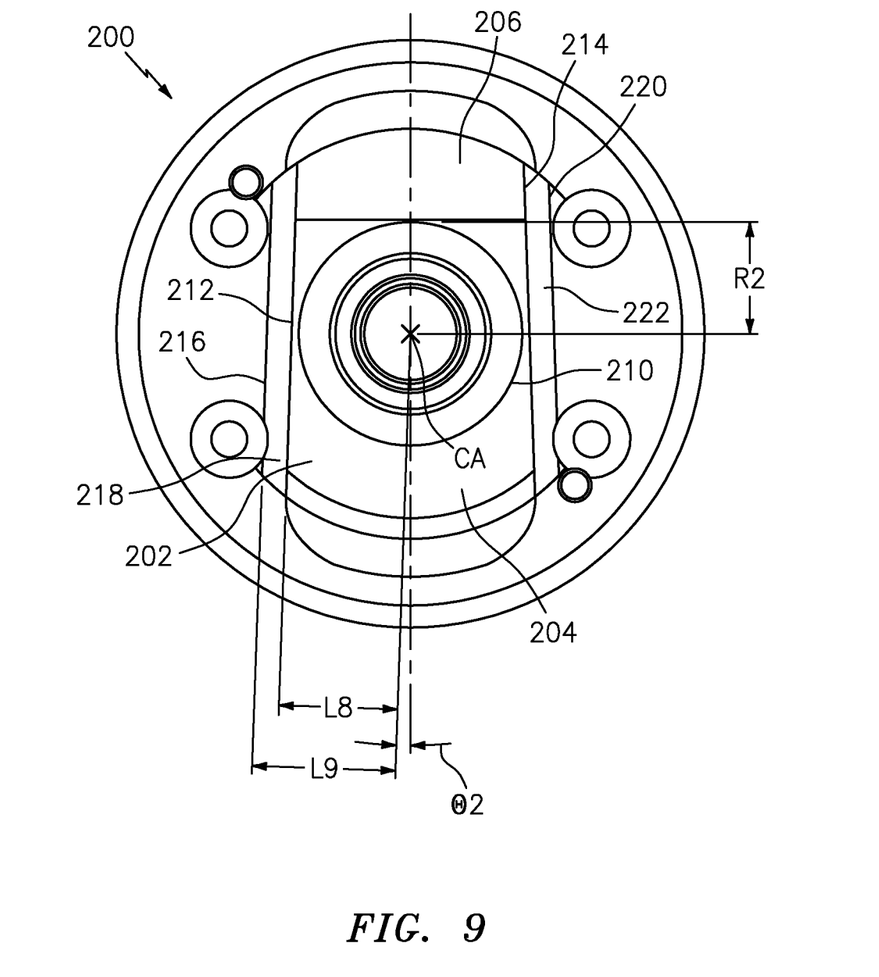
FIG. 9 is an end view of the carrier shaft portion of the carrier shaft assembly of FIG. 1 at the carrier shaft side.

FIG. 9 is an end view of the carrier shaft portion 20 of the carrier shaft assembly 10 of FIG. 1 at the carrier shaft side 200. In an embodiment, an outer surface R2 of a shaft portion 210 is about 0.75 inches (1.905 cm) relative to CA. The wider wedge portion 204 and the narrower wedge portion 206 are defined by edges 212 and 214 of the wedge-shaped member 202 offset at an angle Θ2 of about 2 degrees from normal with respect to CA. An outer edge 216 defines a taper region 218 relative to edge 212, and an outer edge 220 defines a taper region 222 relative to edge 214 such that the taper regions 218 and 222 are substantially symmetric about CA with respect to each other. In an embodiment, a length L8 defined between CA and edge 212 is about 0.781 inches (1.984 cm), and a length L9 defined between CA and outer edge 216 is about 0.95 inches (2.413 cm). A ratio of length L8 to the outer surface R2 is between 1.01 and 1.07. A ratio of length L9 to the outer surface R2 is between 1.23 and 1.30.

Figure 10:
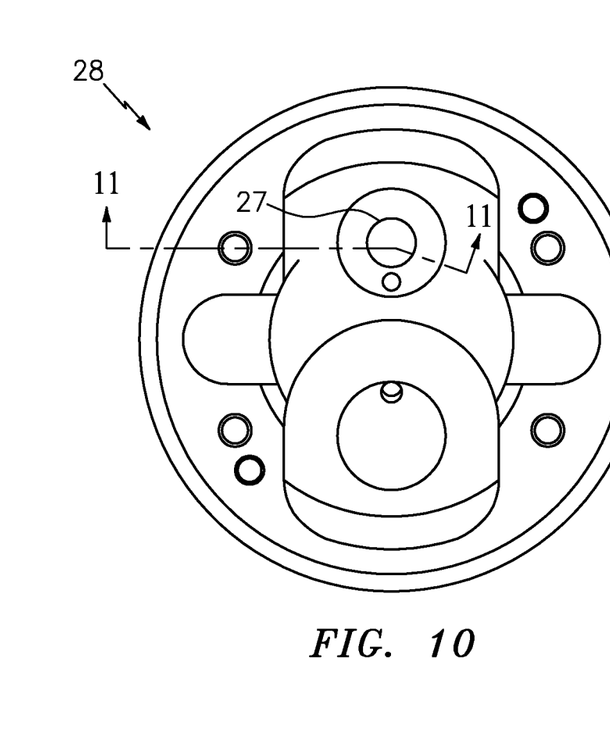
FIG. 10 is an end view of the carrier shaft portion of the carrier shaft assembly of FIG. 1 on a planetary gear set side.
Figure 11:
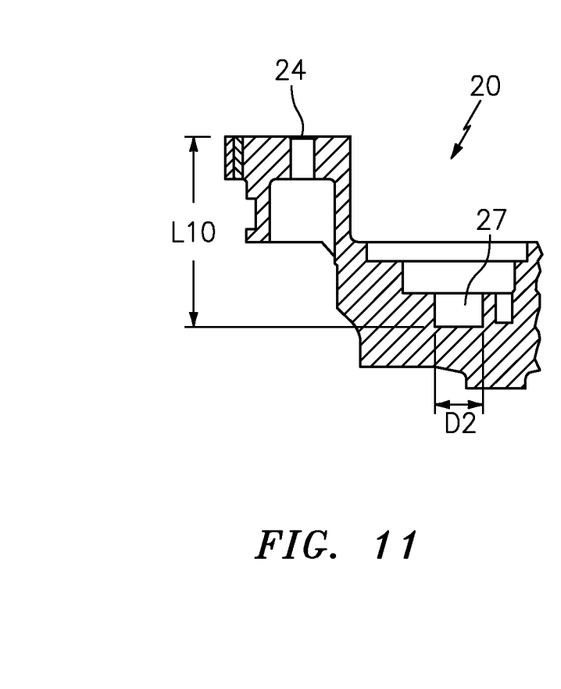
FIG. 11 is a cross-sectional view of the carrier shaft portion of the carrier shaft assembly of FIG. 1.

FIG. 10 is an end view of the carrier shaft portion 20 of the carrier shaft assembly 10 of FIG. 1 on the planetary gear set side 28. Section line 11-11 in FIG. 10 defines a cross-sectional view of the carrier shaft portion 20 as depicted in FIG. 11. FIG. 11 depicts bore 27 is greater detail. In an embodiment, the bore 27 extends a length L10 of about 1.447 inches (3.675 cm) from the planetary gear set end 24 and has a diameter D2 of about 0.375 inches (0.953 cm). A ratio of length L10 to diameter D2 is between 3.73 and 4.

A method for assembling a carrier shaft assembly, such as the carrier shaft assembly 10 of FIG. 1, includes providing an input carrier shaft portion 30 having an input carrier shaft portion axis ICA defined between a planetary gear set end 32 and an input shaft end 34, where the input shaft end 34 has an outer surface R1. The input carrier shaft portion 30 includes a wedge-shaped member 102 having an edge 108 and an outer edge 112 that defines a taper region 114 relative to the edge 108 of the wedge-shaped member 102. A ratio of a length L2 defined between the input carrier shaft portion axis ICA and the outer edge 112 to the outer surface R1 of the input shaft end 34 is between 1.23 and 1.30. The method also includes providing a carrier shaft portion 20 having a carrier shaft portion axis CA defined between a planetary gear set end 24 and a shaft end 22. The carrier shaft portion 20 includes a shaft portion 210 having an outer surface R2 and a wedge-shaped member 202 having an edge 212 and an outer edge 216 that defines a taper region 218 relative to the edge 212 of the wedge-shaped member 202. A ratio of a length L9 defined between the carrier shaft portion axis CA and the outer edge 216 of the wedge-shaped member 202 to the outer surface R2 of the shaft portion 210 is between 1.23 and 1.30. The method further includes aligning the input carrier shaft portion axis ICA of the input carrier shaft portion 30 with the carrier shaft portion axis CA of the carrier shaft portion 20 to form a principle axis A of the carrier shaft assembly 10.

As previously described the wedge-shaped member 102 of the input carrier shaft portion 30 can include a wider wedge portion 104 and a narrower wedge portion 106, and the wedge-shaped member 202 of the carrier shaft portion 20 can include a wider wedge portion 204 and a narrower wedge portion 206. Aligning the input carrier shaft portion axis ICA with the carrier shaft portion axis CA may also include axially aligning the wider wedge portion 104 of the input carrier shaft portion 30 with the narrower wedge portion 206 of the carrier shaft portion 20 and axially aligning the wider wedge portion 204 of the carrier shaft portion 20 with the narrower wedge portion 106 of the input carrier shaft portion 30. The method can also include inserting a planetary gear set 40 between the input carrier shaft portion 30 and the carrier shaft portion 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A carrier shaft set, comprising:
   an input carrier shaft portion having an input carrier shaft portion axis defined between a planetary gear set end and an input shaft end, the input shaft end having an outer surface, the input carrier shaft portion comprising a wedge-shaped member having an edge and an outer edge that defines a taper region relative to the edge of the wedge-shaped member, wherein a ratio of a length defined between the input carrier shaft portion axis and the outer edge to the outer surface of the input shaft end is between 1.23 and 1.30; and
   a carrier shaft portion having a carrier shaft portion axis defined between a planetary gear set end and a shaft end, the carrier shaft portion comprising a shaft portion having an outer surface and a wedge-shaped member having an edge and an outer edge that defines a taper region relative to the edge of the wedge-shaped member, wherein a ratio of a length defined between the carrier shaft portion axis and the outer edge to the outer surface of the shaft portion is between 1.23 and 1.30.

2. The carrier shaft set of claim 1, wherein the wedge-shaped member of the input carrier shaft portion further comprises a wider wedge portion and a narrower wedge portion, the wedge-shaped member of the carrier shaft portion further comprises a wider wedge portion and a narrower wedge portion, the wider wedge portion of the input carrier shaft portion is axially aligned with the narrower wedge portion of the carrier shaft portion, and the wider wedge portion of the carrier shaft portion is axially aligned with the narrower wedge portion of the input carrier shaft portion.

3. The carrier shaft set of claim 2, wherein a ratio of a length defined between the planetary gear set end and the input shaft end of the input carrier shaft portion to a length defined between the planetary gear set end and a surface of the narrower wedge portion of the input carrier shaft portion is between 1.39 and 1.43.

4. The carrier shaft set of claim 2, wherein a ratio of a length defined between the planetary gear set end and the shaft end of the carrier shaft portion to a length defined between the planetary gear set end and a surface of the wider wedge portion of the carrier shaft portion is between 3.44 and 3.49.

5. The carrier shaft set of claim 1, wherein a ratio of a length defined between the input carrier shaft portion axis and the edge of the wedge-shaped member of the input carrier shaft portion to the outer surface of the input shaft end is between 1.01 and 1.07, and a ratio of a length defined between the carrier shaft portion axis and the edge of the wedge-shaped member of the carrier shaft portion to the outer surface of the shaft portion is between 1.01 and 1.07.

6. The carrier shaft set of claim 1, wherein the edge of the wedge-shaped member of the input carrier shaft portion is offset by an angle of about 2 degrees from normal with respect to the input carrier shaft portion axis.

7. The carrier shaft set of claim 1, wherein the input carrier shaft portion further comprises a bore that extends a length from the planetary gear set end of the input carrier shaft portion, and a ratio of the length that the bore extends from the planetary gear set end to a diameter of the bore is between 2.2 and 2.3.

8. The carrier shaft set of claim 1, wherein the carrier shaft portion further comprises a bore that extends a length from the planetary gear set end of the carrier shaft portion, and a ratio of the length that the bore extends from the planetary gear set end to a diameter of the bore is between 3.73 and 4.

9. A method of assembling a carrier shaft assembly, comprising:
   providing an input carrier shaft portion having an input carrier shaft portion axis defined between a planetary gear set end and an input shaft end, the input shaft end having an outer surface, the input carrier shaft portion comprising a wedge-shaped member having an edge and an outer edge that defines a taper region relative to the edge of the wedge-shaped member, wherein a ratio of a length defined between the input carrier shaft portion axis and the outer edge to the outer surface of the input shaft end is between 1.23 and 1.30;
   providing carrier shaft portion having a carrier shaft portion axis defined between a planetary gear set end and a shaft end, the carrier shaft portion comprising a shaft portion having an outer surface and a wedge-shaped member having an edge and an outer edge that defines a taper region relative to the edge of the wedge-shaped member, wherein a ratio of a length defined between the carrier shaft portion axis and the outer edge to the outer surface of the shaft portion is between 1.23 and 1.30; and
   aligning the input carrier shaft portion axis of the input carrier shaft portion with the carrier shaft portion axis of the carrier shaft portion to form a principle axis of the carrier shaft assembly.

10. The method of claim 9, wherein the wedge-shaped member of the input carrier shaft portion further comprises a wider wedge portion and a narrower wedge portion, the wedge-shaped member of the carrier shaft portion further comprises a wider wedge portion and a narrower wedge portion, and aligning the input carrier shaft portion axis with the carrier shaft portion axis further comprises axially aligning the wider wedge portion of the input carrier shaft portion with the narrower wedge portion of the carrier shaft portion and axially aligning the wider wedge portion of the carrier shaft portion with the narrower wedge portion of the input carrier shaft portion.

11. The method of claim 9, further comprising inserting a planetary gear set between the input carrier shaft portion and the carrier shaft portion.

12. The method of claim 11, wherein the planetary gear set further comprises a first planet shaft with a first planet gear and a second planet shaft with a second planet gear.

13. The method of claim 12, wherein the carrier shaft portion further comprises a bore that extends a length from the planetary gear set end of the carrier shaft portion, the bore is proximate the first planet shaft, and a ratio of the length that the bore extends from the planetary gear set end to a diameter of the bore is between 3.73 and 4.

14. The method of claim 12, wherein the input carrier shaft portion further comprises a bore that extends a length from the planetary gear set end of the input carrier shaft portion, the bore is proximate the second planet shaft, and a ratio of the length that the bore extends from the planetary gear set end to a diameter of the bore is between 2.2 and 2.3.

15. The method of claim 9, wherein the edge of the wedge-shaped member of the input carrier shaft portion is offset by an angle of about 2 degrees from normal with respect to the input carrier shaft portion axis.

\* \* \* \* \*